(12) United States Patent
Bera et al.

US011151404B2

(10) Patent No.: US 11,151,404 B2
(45) Date of Patent: Oct. 19, 2021

(54) OBJECT RECOGNITION WITH DYNAMIC SWITCHING OF VISUAL RECOGNITION PROCESSES USING AN IMAGE CAPTURING DEVICE

(71) Applicant: INTERNATIONAL BUSINESS MACHINES CORPORATION, Armonk, NY (US)

(72) Inventors: Jhilam Bera, Bangalore (IN); Vijay Kumar Ananthapur Bache, Karnataka (IN); Lizet Ernand, Cedar Park, TX (US); Vijay Ekambaram, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 16/701,436

(22) Filed: Dec. 3, 2019

(65) Prior Publication Data

US 2021/0166056 A1    Jun. 3, 2021

(51) Int. Cl.
*G06K 9/46* (2006.01)
*G06K 9/00* (2006.01)
(Continued)

(52) U.S. Cl.
CPC ....... *G06K 9/4642* (2013.01); *G06K 9/00671* (2013.01); *G06N 3/0454* (2013.01); *G06N 3/08* (2013.01)

(58) Field of Classification Search
CPC ............. G06K 9/00671; G06K 9/4642; G06N 3/0454; G06N 3/08
See application file for complete search history.

(56) References Cited

U.S. PATENT DOCUMENTS 9,355,123 B2   5/2016  Wnuk et al.
10,325,178 B1  6/2019  Tang et al.
(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
(Continued)

*Primary Examiner* — David Bilodeau
(74) *Attorney, Agent, or Firm* — Michael A. Petrocelli, Esq.; Kevin P. Radigan, Esq.; Heslin Rothenberg Farley & Mesiti P.C.

(57) ABSTRACT

A processor(s) processes multiple image frames of a scene for object recognition by applying a first process of a plurality of visual recognition processes using different grid sizes, to one or more image frames. The first process divides the image frame(s) into an m×m grid to determine bounding boxes for identifying one or more objects. Based on detecting passage of a predefined time interval, less than a period of time represented by the image frames, processing dynamically switches to a second process to process one or more other image frames. The second process is applied to the other image frame(s), dividing the other image frame(s) into an n×n grid to determine bounding boxes for identifying one or more other objects in the other image frame(s), where the n×n grid used by the second process is different from the m×m grid.

20 Claims, 11 Drawing Sheets

(51) Int. Cl.
*G06N 3/04* (2006.01)
*G06N 3/08* (2006.01)

(56) References Cited

U.S. PATENT DOCUMENTS

| | | | |
|---|---|---|---|
| 10,332,245 | B1 | 6/2019 | Price et al. |
| 2011/0249867 | A1 | 10/2011 | Haas et al. |
| 2012/0320269 | A1 | 12/2012 | Feris et al. |
| 2013/0011016 | A1 | 1/2013 | Haas et al. |
| 2013/0101157 | A1 | 4/2013 | Li et al. |
| 2013/0147970 | A1 | 6/2013 | Herring et al. |
| 2014/0185925 | A1 | 7/2014 | Datta et al. |
| 2015/0178931 | A1* | 6/2015 | Gao ............... G06T 11/00 382/103 |
| 2016/0092741 | A1 | 3/2016 | Li et al. |
| 2017/0091584 | A1 | 3/2017 | Bhat et al. |
| 2017/0316285 | A1 | 11/2017 | Ahmed et al. |
| 2018/0300564 | A1* | 10/2018 | Kwant ............... G06K 9/48 |
| 2018/0300631 | A1* | 10/2018 | Roy ............... G06N 3/088 |
| 2019/0147221 | A1* | 5/2019 | Grabner ............... G06T 7/75 382/103 |
| 2020/0019765 | A1* | 1/2020 | Ampatzidis ........ G06N 3/0454 |
| 2020/0143279 | A1* | 5/2020 | West ............... G06F 16/906 |
| 2020/0193152 | A1* | 6/2020 | Vesdapunt ............ G06F 3/017 |
| 2020/0365035 | A1* | 11/2020 | Im ............... G06K 9/00771 |
| 2020/0377108 | A1* | 12/2020 | Balazs ............... G06K 9/00805 |
| 2020/0380306 | A1* | 12/2020 | Hada ............... G06N 3/0481 |
| 2021/0019982 | A1* | 1/2021 | Todd ............... G06K 9/00335 |

OTHER PUBLICATIONS

Zhang et al., "Adaptive Algorithm and Platform Selection for Visual Detection and Tracking", ArXiv, 1605:06597v1 [cs.CV], May 2016 (10 pages).
Alvar et al., "MV-YOLO: Motion Vector-Aided Tracking by Semantic Object Detection", ArXiv, 1805:00107v2 [cs.CV], Jun. 15, 2018 (6 pages).
"YOLO: Real-Time Object Detection", https://pjreddie.com/darknet/yolo, downloaded Sep. 20, 2019 (5 pages).

* cited by examiner

OBJECT RECOGNITION WITH DYNAMIC SWITCHING OF VISUAL RECOGNITION PROCESSES USING AN IMAGE CAPTURING DEVICE

BACKGROUND

Existing visual recognition algorithms, such as classifiers, neural networks, convolution neural networks, etc., achieve high accuracy when captured images contain one or two objects that are relatively large within the image. However, the accuracy of existing algorithms often decreases when multiple objects are present within the image.

One solution for object recognition is the use of bounding box algorithms. Such algorithms, which often include neural networks or convolution neural networks, can detect a plurality of objects within an image and assign one or more possible boxes to the detected objects. The boxes define areas of the image corresponding to detected objects.

SUMMARY

Certain shortcomings of the prior art are overcome and additional advantages are provided through the provision, in one or more aspects, of a computer-implemented method of processing, by one or more processors, multiple image frames of a captured scene for object recognition, where the multiple image frames are captured over a period of time. The processing includes applying a first visual recognition process, of a plurality of visual recognition processes using different grid sizes, to one or more image frames of the multiple image frames. The first visual recognition process divides the one or more image frames into an m×m grid to determine bounding boxes for identifying one or more objects in the one or more image frames. The method further includes, based on detecting passage of a predefined time interval, less than the period of time, dynamically switching to a second visual recognition process of the plurality of visual recognition processes to process one or more other image frames of the multiple image frames, and applying the second visual recognition process to the one or more other image frames of the multiple image frames. The second visual recognition process divides the one or more other image frames into an n×n grid to determine bounding boxes for identifying one or more other objects in the one or more other image frames, in addition to the one or more objects in the one or more image frames identified by applying the first visual recognition process. The n×n grid used by the second visual recognition process is different from the m×m grid used by the first visual recognition process.

Systems and computer program products relating to one or more aspects are also described and claimed herein. Further, services relating to one or more aspects may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of a visual recognition system, method and/or computer program product such as disclosed herein.

Figure 8:
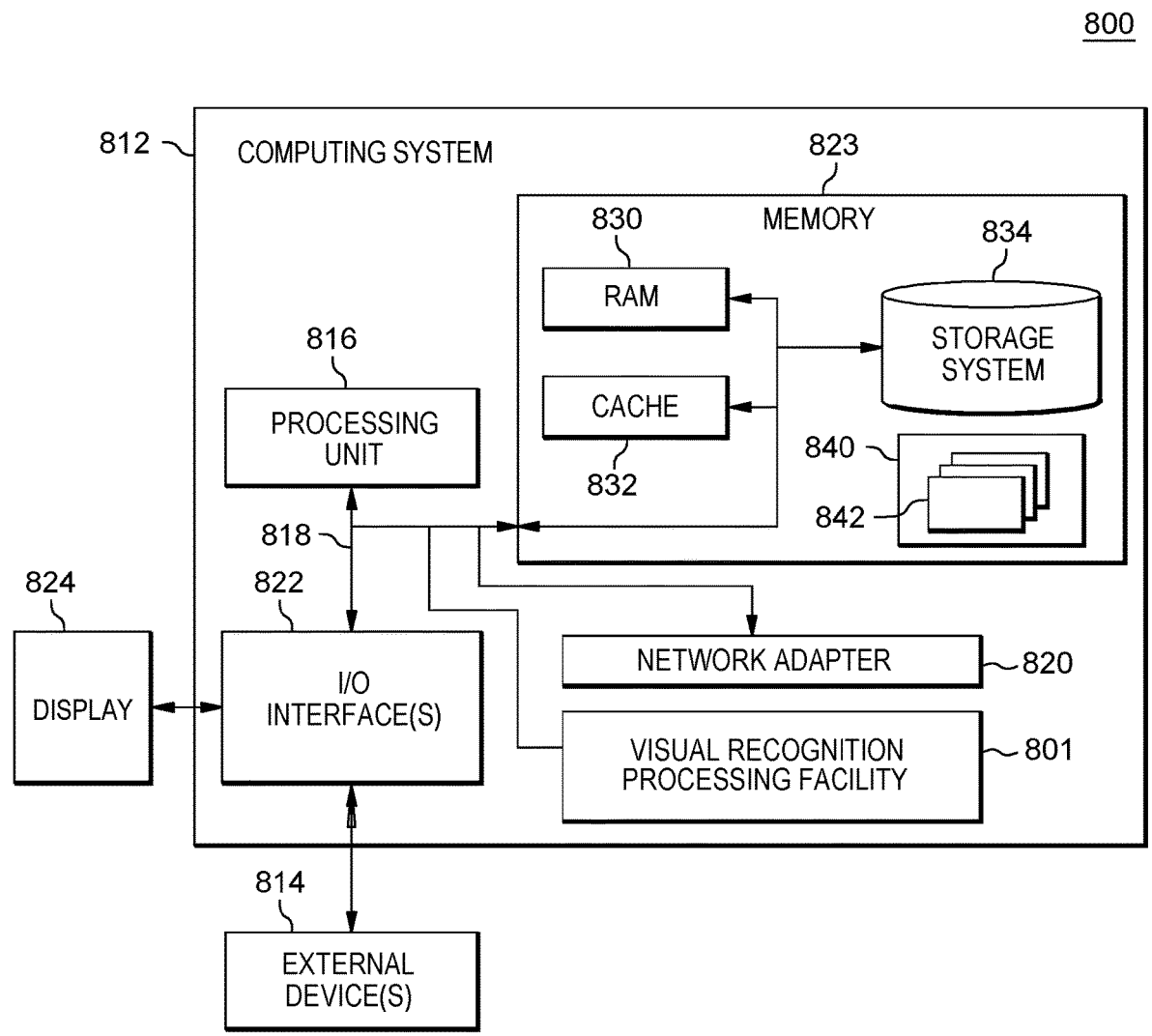
FIG. 8 depicts one embodiment of a computing system which can implement or facilitate implementing visual recognition processing, in accordance with one or more aspects of the present invention.

As understood by one skilled in the art, program code, as referred to throughout this application, includes both software and hardware. For example, program code in certain embodiments of the present invention includes fixed function hardware, while other embodiments utilize a software-based implementation of the functionality described. Certain embodiments combine both types of program code. One example of program code, also referred to as one or more programs, is depicted in FIG. 8 as program/utility 840, having a set (at least one) of program modules 842, which can be stored in memory 823. As a further example, in FIG. 2 program code implementing one or more aspects described herein could be stored or resident within main memory 208, read-only memory 224, disk storage 226, CD-ROM 230, and/or in one or more other peripheral devices of a computing environment 200.

As explained herein, various embodiments disclosed relate to visual recognition processing of image frames, or images, of multiple frames of a scene, such as successively captured image frames of a video segment. Embodiments disclosed herein can be implemented using one or more processors and memory operatively coupled to the one or more processors. The one or more processors can include one or more microprocessors, such as a central processing unit (CPU), a graphics processing unit (GPU), or other circuitry capable of executing program code and carrying out the instructions of the program code by performing the operations specified by the instructions.

In one or more embodiments, the one or more processors can include one or more special-purpose devices built according to embodiments disclosed herein, and suitable circuit elements, such as application-specific integrated circuits (ASICs), field-programmable gate arrays (FPGAs), etc. In one or more embodiments, the memory operatively coupled to the one or more processors can include a volatile memory, such as random access memory (RAM), a non-volatile memory, such as a hard disk drive, a flash memory, etc., or combinations thereof.

The one or more processors are configured to receive an image or image frame which is a digital representation of a scene formed by one or more light beams. The image can include a plurality of pixels, each storing corresponding color and/or intensity data. Further, the image can be stored as raw data, or in any appropriate format, such as bitmap (BMP) format, joint photographic experts group (JPEG) format, graphic interchange format (GIF), tagged image file format (TIFF), etc. The one or more processors can receive the image from a memory, for instance, via one or more buses, from a computer network, for instance, using a network interface controller, from an image sensor, such as a charge-coupled device (CCD), a complementary metal-oxide-semiconductor (CMOS), etc.

A variety of visual recognition systems and methods exist for detecting objects within an image. Many of these approaches use an artificial neural network. An artificial neural network (ANN), also referred to as a neural network, is a computing system made up of a number of highly interconnected processing elements or nodes, which process information by their dynamic state response to external inputs. ANNs are processing devices (algorithms and/or hardware) that might use, or have, hundreds or thousands of processor units.

In machine learning, a convolutional neural network (CNN) is a type of artificial neural network in which the connectivity pattern between the nodes is inspired by the organization of a visual cortex, whose individual neurons are arranged to respond to overlapping regions tiling a visual field. Convolution networks mimic biological processes and are configured as variations on multilayer perceptrons designed to use minimal amounts of pre-processing while processing data, such as digital images.

A region-based convolution neural network (RCNN) is a CNN that has been trained to identify regions of digital image data where an object of interest might be present with a certain degree of certainty (or a certain level of confidence).

One of the drawbacks of generic CNNs is that, in order to recognize multiple objects in an image with corresponding bounding boxes (regions of the image) a sliding window technique is typically used in varying scale. The sliding window slides over the image covering overlapping regions, and the data in the overlapping regions is then analyzed. This adds a large computational cost to running the process. RCNNs extend a CNN and mitigate the computational cost by using a separate process that filters the image down to the "most likely" areas to contain an object. These object-proposal approaches use a set of heuristics (e.g., super pixels, color, texture, and others) to determine an image window's likelihood of containing an object of interest. This methodology can significantly reduce the number of object-containing regions that have to be processed by the RCNN. Thus, using a traditional RCNN model can provide better performance in identifying multiple objects and accuracy, but has a down side in that it takes longer time to predict the objects.

The at least one processor of the ANN can be further configured to detect a plurality of bounding boxes within the received image. For example, the at least one processor can use the convolution neural network to detect a plurality of bounding boxes. The convolution neural network can be, for instance, a You-Only-Look-Once (YOLO) architecture, a single-shot detector (SSD) architecture, or the like. Note that, as used herein, a visual recognition process refers, for instance, to a visual recognition algorithm, a visual recognition architecture, or the process embodied thereby.

In operation, the You-Only-Look-Once (YOLO) architecture or algorithm applies a neural network to an entire image, and the network divides the image into an s×s grid to derive bounding boxes, which are boxes drawn around recognized objects, images, etc., and predicted probabilities for each of the regions. The YOLO approach is an extremely fast, real-time, multi-object detection algorithm or architecture. The method employed to derive the probabilities is logistic regression. The bounding boxes are weighted by the associated probabilities. For class prediction, independent logistic classifiers can be used.

The YOLO algorithm in operation determines the location within an image where one or more objects are present, as well as classifying those objects. In the RCNN approach and its variations, a pipeline is used to perform this task in multiple steps, which can be slow to run and hard to optimize. The YOLO process accomplishes the same function within a single neural network. The YOLO approach is to frame the object detection operation as a single regression problem, straight from image pixels to bounding box coordinates, and class probabilities.

Figure 1:
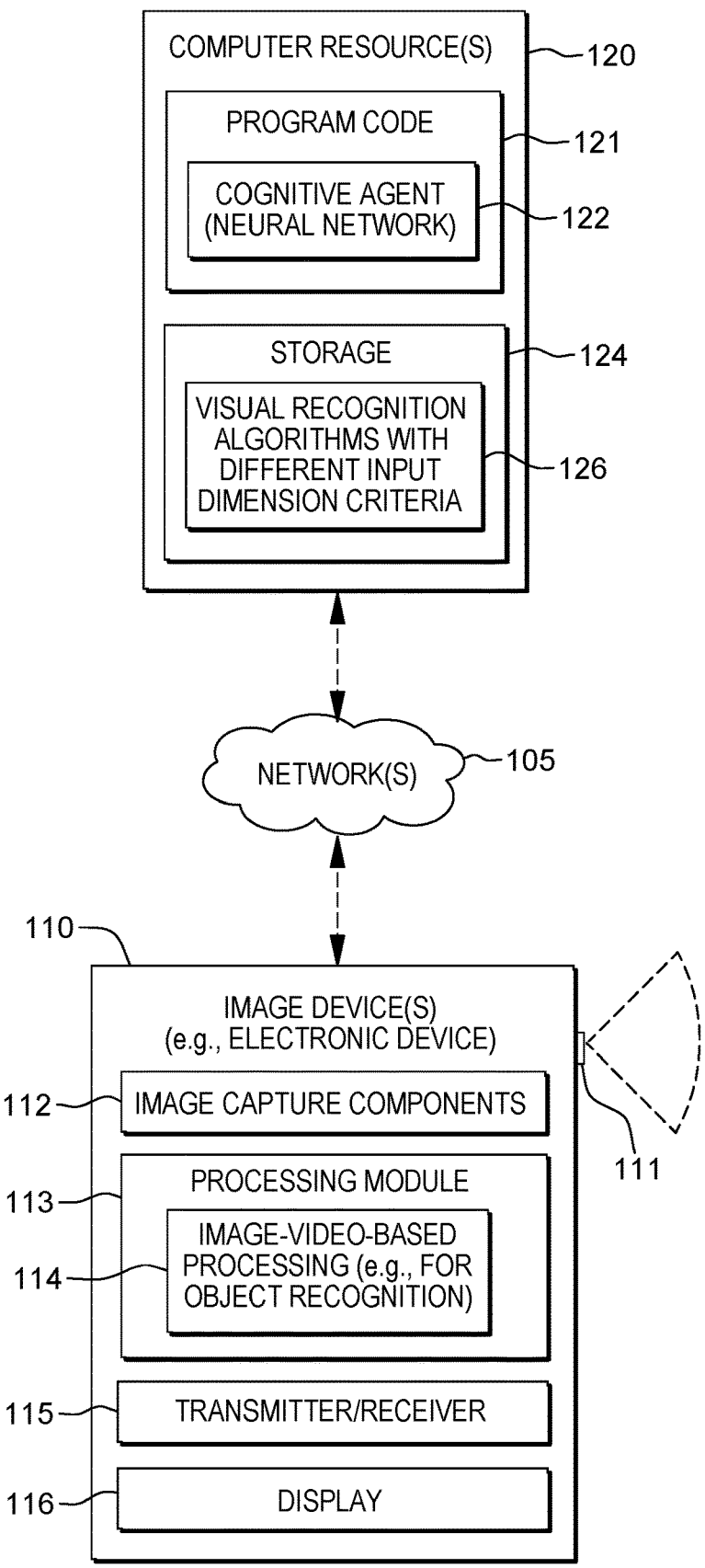
FIG. 1 depicts a block diagram of a technological environment or system in which one or more illustrative embodiments can be implemented.
Figure 2:
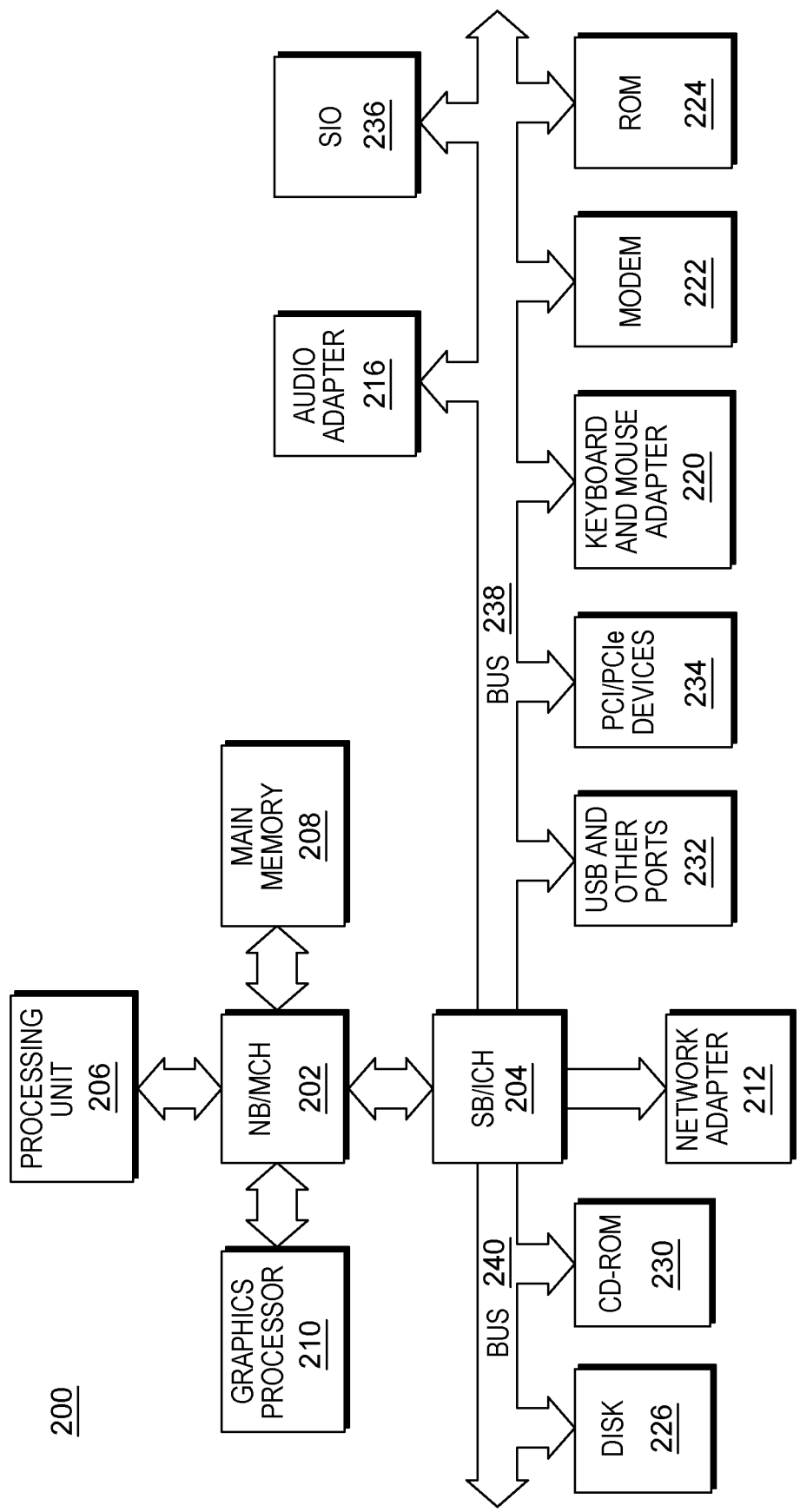
FIG. 2 depicts a block diagram of a data processing system into which various aspects of an embodiment of visual recognition processing can be implemented, in accordance with one or more aspects of the present invention.

Before discussing object detection using visual recognition algorithm processing further, FIGS. 1 & 2 depict exemplary embodiments of processing environments in which illustrative embodiments can be implemented. FIGS. 1 and 2 are only examples and are not intended to imply limitation with regard to the environments in which different embodiments can be implemented. A particular implementation can have any number of modifications to the depicted environments.

By way of example, FIG. 1 depicts one embodiment of an environment or system 100 into which various aspects of some embodiments of the present invention can be implemented. System 100 includes computing devices, including one or more imaging devices 110, such as an electronic device. By way of example, in one or more embodiments, the imaging device(s) 110 can have a wireless communication capability, and can be, for instance, a camera, an imaging system such as a video imaging system, or an electronic device incorporating a camera and/or video imaging system. For instance, the electronic device can be a smartphone, a wireless computer, a tablet, a personal digital assistant (PDA), a laptop computer, etc. Note further in this regard that the imaging device(s) 110 can (in one or more embodiments) be at a fixed location, as is the case with a security camera or other monitoring system camera or video recorder.

As an example, one conceptual embodiment of imaging device(s) 110 is depicted in FIG. 1. As shown, imaging device(s) 110 can include digital image capture components 112, such as conventional image or video camera components (including an image lens 111), as well as other image-capture-related components of a variable focus camera or imaging system, and related sensor data. Further, a processing module 113 can be associated with imaging device(s) 110, and can include image-video-based processing for, for instance, object detection such as disclosed herein, as well as transmitter and/or receiver logic or circuitry 114, and optionally, a display 115 for displaying a scene being captured. Note that imaging device(s) 110 can include additional components, modules, subsystems, etc., without departing from the spirit of the present invention.

In the exemplary embodiment of FIG. 1, system 100 further includes one or more computer resources 120, which can be part of imaging device(s) 110, or associated with the imaging device(s) 110, or disposed remote from the imaging device(s) 110. As depicted, computer resource(s) 120 executes program code 121 implementing, at least in part, a cognitive agent 122, such as a neural network or convolution neural network used for visual recognition of objects within an image, as discussed herein. Further, computer resource(s) 120 can include storage 124 for storing data, such as multiple visual recognition algorithms with different input dimension criteria 126, as well as other data, depending on the implementation.

One or more networks 105 operatively couple, for instance, imaging device(s) 110 and computer resource(s) 120. By way of example only, network(s) 105 can be or include, one or more buses, or other links, a telecommunications network, a local area network (LAN), a wide area network (WAN), such as the Internet, or a combination thereof, and can include wired, wireless, fiber optic connections, etc. The network(s) can include one or more wired and/or wireless networks that are capable of receiving and transmitting data, including video and/or image data, as well as other data, depending on the implementation.

As will be understood by those skilled in the art, in one or more implementations, the program code and/or cognitive agent can be pre-trained models or algorithms that enable visual content to be evaluated to detect objects, as desired for a particular application. Note that as used herein, the term "object" refers to any object, item, article, apparatus, vehicle, place, building, item, device, entity, element, body, individual, animal, etc., for which the algorithm has been pre-trained to recognize or detect.

In some embodiments of the present invention, the program code utilizes a neural network to analyze images and identify objects. Neural networks are a biologically-inspired programming paradigm which enable a computer to learn from observational data, in this case, image data. This learning is referred to as deep learning, which is a set of techniques for learning in neural networks. Neural networks, including modular neural networks, are capable of pattern recognition with speed, accuracy, and efficiency, in the situations where data sets are multiple and expansive, including across a distributed network, including but not limited to, cloud computing systems. Modern neural networks are non-linear statistical data modeling tools. They are usually used to model complex relationships between inputs and outputs, or to identify patterns of data (i.e., neural networks are non-linear statistical data modeling or decision making tools). In general, program code utilizing neural networks can model complex relationships between inputs and outputs and identify patterns and attributes of data. Because of the speed and efficiency of neural networks, especially when parsing multiple complex data sets, neural networks and deep learning provide solutions for real-time processing and organizing of data, such as image data, from a variety of types of sources. Neural networks can be used in embodiments of the present invention to cognitively analyze video or other image content for object detection and/or recognition, in accordance with the processes disclosed herein.

As noted, a variety of neural networks exist for facilitating visual recognition of an object within an image. The neural network can be generic, or tailored for a particular function, that is, to identify a particular type of object or issue. As one specific example only, Watson® Visual recognition for CORE ML brings artificial intelligence into a mobile device space, with pre-trained models available. The Watson® Visual recognition for CORE ML is available through International Business Machines Corporation, Armonk, N.Y., USA. Supported object detection libraries include You-Only-Look-Once (YOLO), region-based convolution neural network (RCNN), and single-shot multi-box detector (SSD). Those skilled in the art will recognize that other artificial intelligence-based platforms are available today, which can be used to implement visual recognition processing such as described herein.

Referring to FIG. 2, a block diagram of a data processing system in which illustrative embodiments can be implemented is shown by way of further example. Data processing system 200 is an example of a computer, such as computer resource(s) 120, and/or imaging device(s) 110 in FIG. 1, or another type of device in which computer-usable program code or instructions implementing processes such as disclosed herein can be located, in one or more embodiments.

In the depicted example, data processing system 200 includes a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 can contain one or more processors and even can be implemented using one or more heterogeneous processor systems. Graphics processor 210 can be coupled to the NB/MCH through an accelerated graphics port (AGP), for example.

In the depicted example, a local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices can include, for example, Ethernet adapters, add-in cards, and PC cards for notebook computers. PCI uses a card bus controller, while PCIe does not. ROM 224 can be, for example, a flash binary input/output system (BIOS). Hard disk drive 226 and CD-ROM 230 can use, for example, an integrated drive electronics (IDE) or serial advanced technology attachment (SATA) interface. A super I/O (SIO) device 236 can be coupled to south bridge and I/O controller hub 204.

An operating system runs on processing unit 206 and coordinates and provides control of various components within data processing system 200 in FIG. 2. The operating system can be a commercially available operating system. An object oriented programming system can run in conjunction with the operating system and provide calls to the operating system from programs or applications executing on data processing system 200.

Instructions for the operating system, the object-oriented programming system, and applications or programs can be located on storage devices, such as hard disk drive 226, and can be loaded into main memory 208 for execution by processing unit 206. The processes of the illustrative aspects discussed herein can be performed by processing unit 206 using computer implemented instructions, which can be located in a memory such as, for example, main memory 208, read only memory 224, or in one or more peripheral devices.

Note that the hardware embodiment depicted in FIG. 2 can vary depending on the desired implementation. Other internal hardware or peripheral devices, such as flash memory, equivalent non-volatile memory, or optical disk drives and the like, can be used in addition to or in place of certain hardware depicted. Also, the processes of the illustrative aspects described herein can be applied to other hardware environments, such as to a multiprocessor data processing system.

In one or more implementations, data processing system 200 can be an electronic device or a server computer resource, and can be generally configured with flash memory to provide non-volatile memory for storing operating system files and/or user-generated data. A bus system can include one or more buses, such as a system bus, an I/O bus and a PCI bus. Of course the bus system can be implemented using any type of communications fabric or architecture that provides for a transfer of data between different components or devices attached to the fabric or architecture. A communications unit can include one or more devices used to transmit and receive data, such as a modem or a network adapter. A memory can be, for example, main memory 208 or a cache such as found in north bridge and memory controller hub 202. A processing unit can include one or more processors or CPUs. Those skilled in the art should note that the depicted system example of FIG. 2, as well as other examples referenced herein, are not meant to imply architectural limitations. As noted, data processing system 200 can be implemented as part of computer resource(s) 120 and/or an imaging device 110 in FIG. 1, such as a part of a smartphone, tablet computer, laptop computer, desktop computer, server, personal digital assistant (PDA), wireless computer, security system, etc., with digital imaging capabilities.

As noted, the illustrated hardware of FIGS. 1-2 can vary depending on the implementation. Other internal hardware or peripheral devices, such as flash memory, equivalent non-volatile memory, or optical disk drives and the like, can be used in addition to or in place of the hardware depicted in FIGS. 1-2. In addition, the processes of the illustrative embodiments can be applied to a multiprocessor data processing system.

As discussed, a variety of visual recognition algorithms are available today that are efficient to recognize or detect objects within an image. Using a traditional RCNN model or algorithm, a system can identify an object accurately. The downside, however, is that RCNN takes a relatively long time to predict objects. On the other hand, to detect an object, a You-Only-Look-Once (YOLO) algorithm takes much less time compared to RCNN. However, in order to recognize differently sized objects from a relatively long time period video, the process can take time. Also, certain predefined parameters can make a significant difference in identifying or detecting objects using the YOLO algorithm.

Further, implementations of various visual recognition models are readily available, including, for instance, for mobile devices such as smartphones. The models can be trained in some other device or system, and can be converted into certain formats in order to support various platforms. These recognition models typically require input dimension and color scale definition.

In operation, the YOLO algorithm scans an image using a kernel, which makes an image into sxs cells, with the grid dimension being a predefined value that is to act on the image. If the number of image cells are too high, the size of the kernel is small. This means, using the YOLO approach, the objects which are trying to be captured are apparently smaller. In this case, training for the expected object would need to have a smaller dimension, which is why a small grid cell is suggested in order to capture such objects. The problem with this approach is that it is not known ahead of time the expected dimension of the identifiable or detectable objects in the image. At certain times, it may happen in a video segment (or captured scene) that an object size is too small to be identified with respect to the distance. If the camera were moved closer to the object, then the shape of the object would fit into the expected and identifiable range of the visual recognition algorithm.

As noted above, disclosed herein are visual recognition processing enhancements to capture or identify more objects from multiple image frames of a scene by dynamically changing input dimension criteria of the type of visual recognition algorithm being used with respect to the scene.

Figure 3:
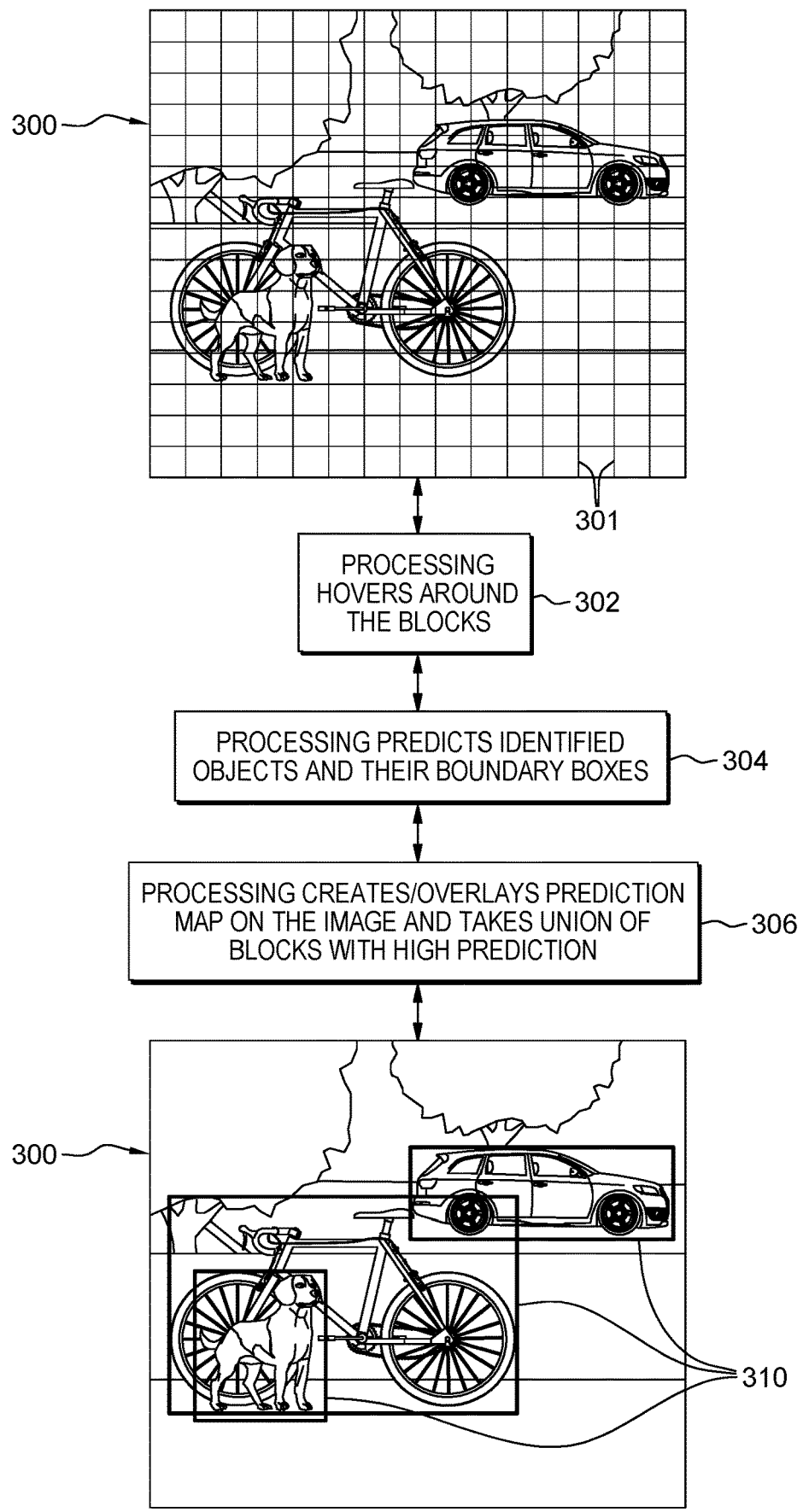
FIG. 3 depicts one embodiment of object detection using a grid-based visual recognition algorithm, which can be used in accordance with one or more aspects of the present invention.

A video segment is made of multiple images or image frames. In operation, a visual recognition algorithm scans the individual frames one-by-one. In a second, the number of frames that can be scanned to obtain the objects in the frames is known as the frame-per-second (FPS) rate of a video recognition process, which is subject to the specific recognition algorithm used. A YOLO algorithm scans a video frame by superimposing a grid on the image frames, which creates a number of blocks on the image frame. After that, a filter hovers over the image frame by convoluting those blocks and searching for objects, and predicting the object's prospective bounding boxes. An example of this is depicted in FIG. 3.

As illustrated, with YOLO visual recognition algorithm processing, an entire image frame 300 is processed by applying an sxs grid to the image frame 300. Processing filters each block 302 and predicts, based thereon, objects, along with an associated bounding or boundary boxes 304. From this, a prediction map can be created or overlaid on the image, with only the union blocks with high prediction likelihood utilized 306, resulting (in one embodiment) with bounding boxes 310 being identified and illustrated over image 300, as shown in FIG. 3. As part of the process, the visual recognition algorithm determines whether there is an object within each cell of the grid, and where present, determines a bounding box for the object, along with a class label identifying the object, based on the training of the model prior to use.

Figure 4:
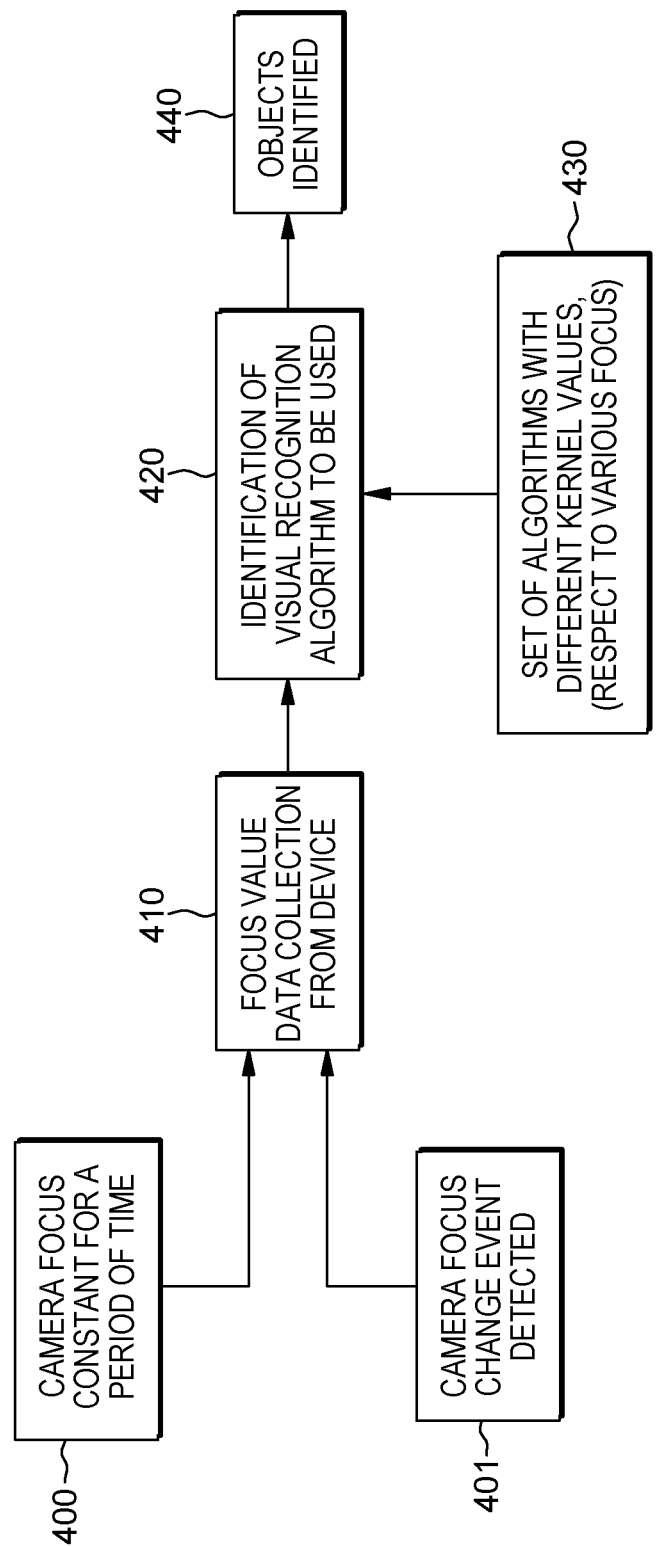
FIG. 4 depicts one embodiment of visual recognition processing, including selecting a visual recognition algorithm to be used for object detection from a set of visual recognition algorithms, in accordance with one or more aspects of the present invention.

FIG. 4 depicts a further embodiment of visual recognition processing of multiple image frames using a selected visual recognition algorithm from a set of algorithms with different kernel values with respect to various focus. As one example, it is assumed that an electronic device has a digital camera and/or video recorder with focal length variable technology. In order to capture an object, the focus length can change according to the relative distance between the camera and the object being imaged. If an object is close to the camera, then the focus length the camera is shorter. Similarly, if the object is far from the camera, then order to capture an image of the object properly, the camera module increases focus of the camera.

In the visual recognition processing embodiment of FIG. 4, processing collects focus information from the imaging device 410. This information can include data indicating that the camera focus remains constant for a period of time 400, as well as data indicative of a camera focus change event 401. Where the focus data is constant for a period of time, an object-to-camera relative distance can be obtained and used in identifying a visual recognition algorithm 420 from a set of visual recognition algorithms with different kernel values (with respect to various focus distances) 430. Using the identified visual recognition algorithm, one or more objects in the image frames of a captured scene can then be recognized 440. By way of example, a visual recognition algorithm can be configured to identify certain objects ($O_1$, $O_2$, $O_3$ . . . ), which happen to be different in size or area covered in an image frame. For a focus ($F_1$), a first visual recognition algorithm ($A_1$) might be best to identify object $O_2$, and for a different focus ($F_2$), a different visual recognition algorithm ($A_2$) might be selected which has different input criteria dimensions to capture objects $O_1$, $O_3$ (in one example). This means that, with respect to camera focus, the visual recognition algorithm can be selected to scan to recognize one or more objects in an image.

Disclosed herein in one or more aspects is an enhanced visual recognition processing approach which collects focus values based on monitoring camera focus data for a period of time, as well as monitoring for a camera focus change event. Based on this information, a visual recognition algorithm is selected from a set of visual recognition algorithms which have different input dimension criteria with respect to focus and object camera relative length. Processing then uses the selected visual recognition algorithm to scan an image frame and identify objects. As noted, an issue can arise where the objects to be recognized are of different size in the captured scene.

Figure 5:
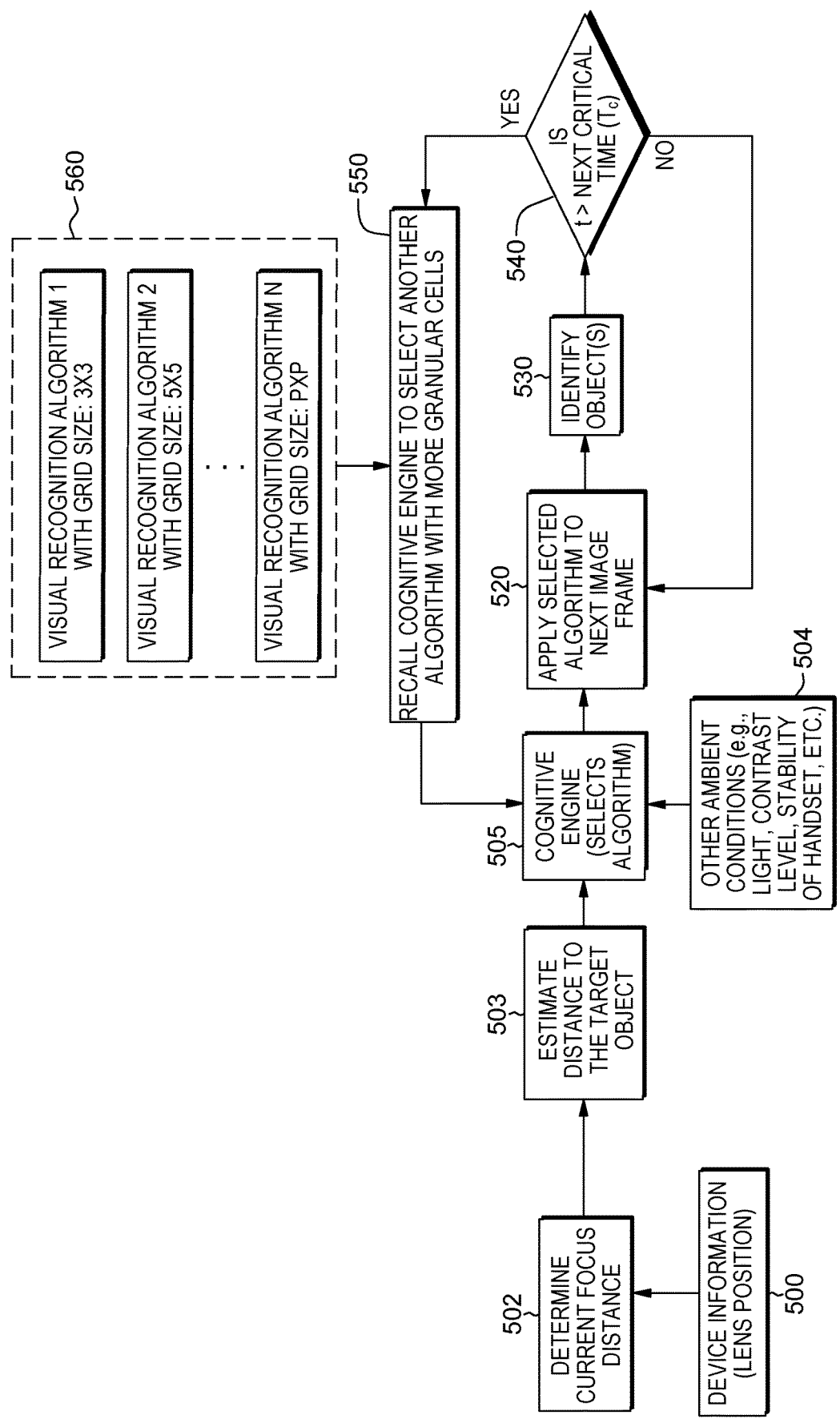
FIG. 5 depicts a further embodiment of visual recognition processing, including dynamically switching between visual recognition algorithms during processing of multiple image frames of a captured scene, in accordance with one or more aspects of the present invention.

FIG. 5 depicts a further embodiment of visual recognition processing, including dynamic switching between visual recognition algorithms during processing of multiple image frames of a scene, in accordance with one or more aspects of the present invention.

As illustrated, imaging device information is received or collected including, for instance, lens position 500, from which the current focus distance of the imaging device can be ascertained 502. The distance from the camera to the target object can then be ascertained 503. A cognitive agent or cognitive engine 505 uses this information, as well as other sensor data on ambient conditions (e.g., light, contrast level, stability of handset, etc.) 504 to select a particular visual recognition algorithm of a plurality of visual recognition algorithms of a common type. In one or more embodiments, the plurality of visual recognition algorithms have different input dimension criteria with respect to camera focus and object-to-camera relative length. As noted, in one or more embodiments, the visual recognition algorithms are set of deep learning-based visual recognition algorithms of a common type. For instance, the set of visual recognition algorithms are YOLO algorithms using different grid sizes. In this processing, multiple image frames are assumed, which can be successive image frames, for instance, from a video segment captured over a period of time, and which have a common focus. The selected, or first, visual recognition algorithm is applied to one or more image frames of the multiple image frames, with the first visual recognition algorithm dividing the one or more image frames into an m×m grid to determine bounding boxes for identifying one or more recognized objects in the one or more image frames, where m is an integer.

As illustrated in FIG. 5, in addition to recognizing and identifying objects 530, processing determines whether a predefined time interval, such as a critical time ($T_c$), has passed. In this regard, the critical time is a time interval that is less than the period of time of the video segment. Assuming that the predefined time interval has passed, processing recalls the cognitive engine to select (in one embodiment) another visual recognition algorithm with more granular grid cells 550. For instance, cognitive engine 505 can select a visual recognition algorithm in the set with the next-most granular grid 560. For example, assuming that the first selected visual recognition algorithm had, for instance, a grid size of 3×3, then the cognitive engine 505 can select the second visual recognition algorithm as the algorithm with grid size 5×5. Note that the grid sizes depicted in FIG. 5 are provided by way of example only. The second visual recognition algorithm is applied to one or more other image frames of the multiple image frames in the captured scene. The second visual recognition algorithm divides the one or more other image frames into an n×n grid to determine bounding boxes for identifying one or more other objects in the one or more other image frames, that is, in addition to the one or more objects in the one or more image frames already identified by applying the first visual recognition algorithm. In this processing, the n×n grid used by the second visual recognition algorithm is different from the m×m grid used by the first visual recognition algorithm.

Note that as described herein, in one or more embodiments, applying the first visual recognition algorithm includes applying by the first visual recognition algorithm a convolution neural network on an entire image frame of the one or more image frames, and applying the second visual recognition algorithm includes applying by the second visual recognition algorithm a convolution neural network to an entire image frame of the one or more other image frames of the multiple image frames. In one or more embodiments, the plurality of visual recognition algorithms are a set of You-Only-Look-Once (YOLO) visual recognition algorithms, each having a different grid size. Note also in connection with the processing of FIG. 5, that multiple critical times can be specified, each being a predefined time interval, which upon passing, indicates to the recognition processing that a different visual recognition algorithm of the set of visual recognition algorithms should be employed to, for instance, look deeper into the scene captured by the multiple image frames to recognize and identify one or more other or further objects.

Figure 6B:
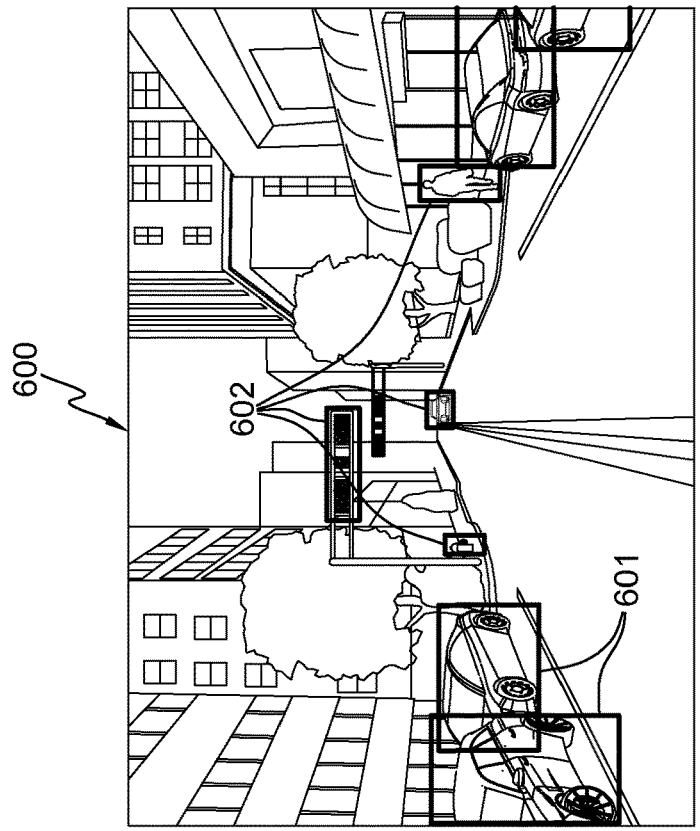
FIGS. 6A & 6B depict one embodiment of object recognition and identification within a captured scene using multiple visual recognition algorithms with different grid sizes, in accordance with one or more aspects of the present invention.
Figure 6A:
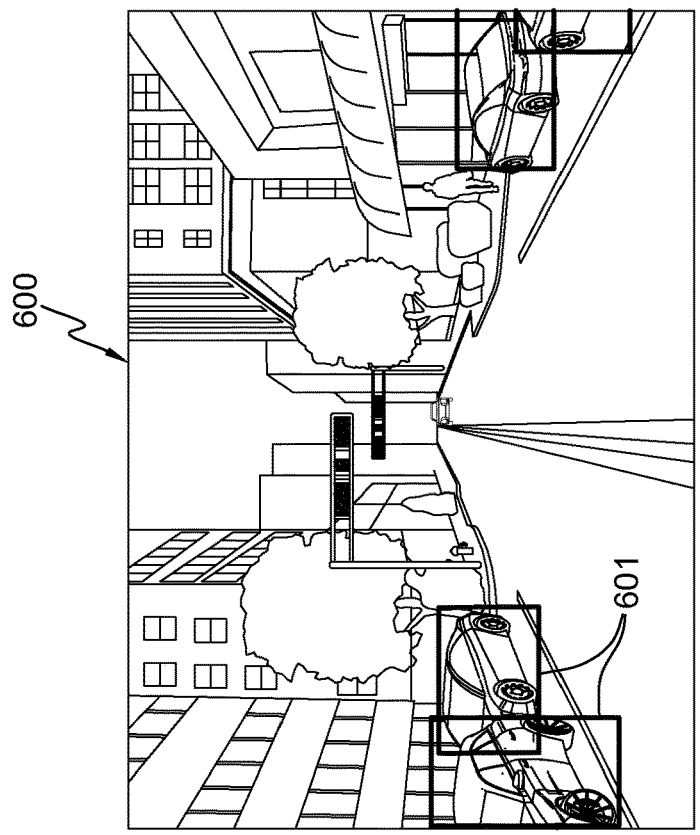

FIGS. 6A & 6B depict an example scene 600 captured in a video segment including multiple image frames. In FIG. 6A, a first visual recognition algorithm has employed a first grid size and recognized and identified objects 601 using respective bounding boxes, and after, for instance, the user holds the imaging device to capture the scene for greater than the critical time ($T_c$), processing has dynamically switched to a second visual recognition algorithm using a different grid size, which results in recognizing and identifying a number of additional objects 602, as illustrated in FIG. 6B.

Further details of one embodiment 700 of visual recognition processing, as it relates to one or more aspects of the present invention, are described with reference to FIGS. 7A & 7B.

Figure 7A:
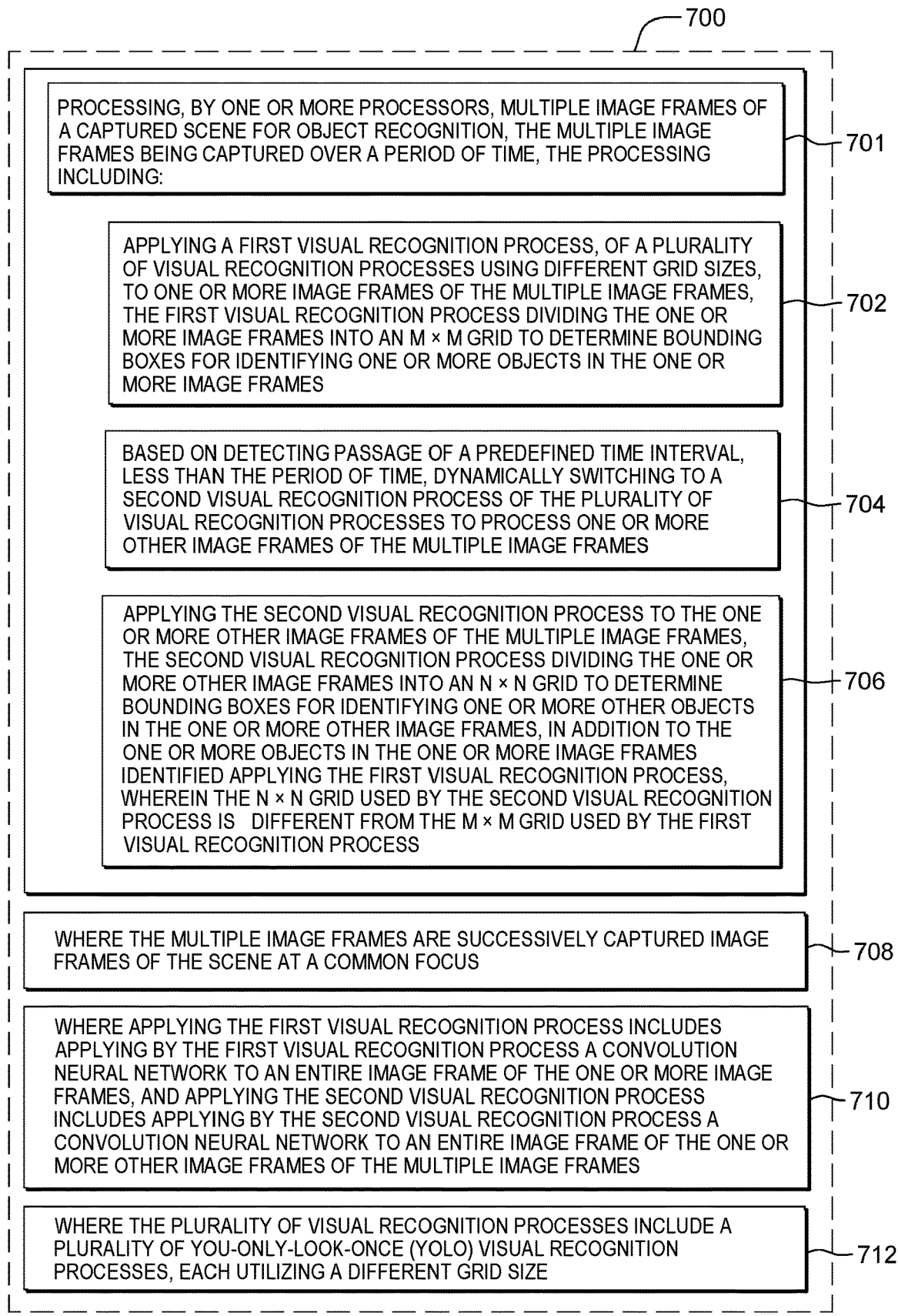
FIGS. 7A & 7B depict one embodiment of visual recognition processing, in accordance with one or more aspects of the present invention.
Figure 7B:
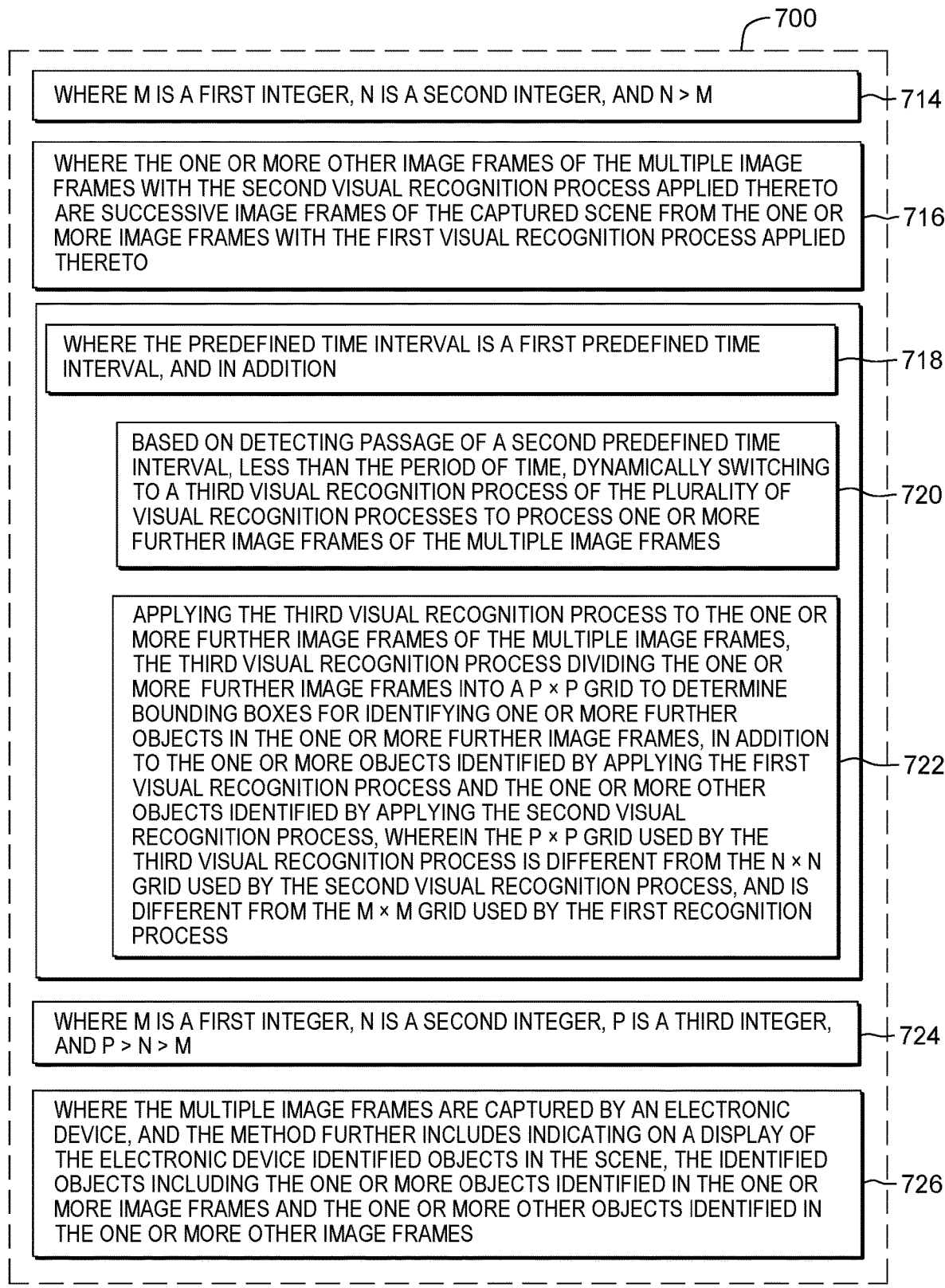

Referring to FIG. 7A, in one embodiment 700, multiple image frames are processed, by one or more processors, for object recognition, where the multiple image frames are captured over a period of time 701. The processing includes applying a first visual recognition process, of a plurality of visual recognition processes using different grid sizes, to one or more image frames of the multiple image frames, the first visual recognition process dividing the one or more image frames into an m×m grid to determine bounding boxes for identifying one or more objects in the one or more image frames 702; based on detecting passage of a predefined time interval, less than the period of time, dynamically switching to a second visual recognition process of the plurality of visual recognition processes to process one or more other image frames of the multiple image frames 704; and applying the visual recognition process to one or more other image frames of the multiple image frames, the second visual recognition process dividing the one or more image frames into an n×n grid to determine bounding boxes for identifying one or more other objects in the one or more other image frames, in addition to the one or more objects in the one or more image frames identified applying the first visual recognition process, where the n×n grid used by the second visual recognition process is different from the m×m grid used by the first visual recognition process 706.

In one or more embodiments, the multiple image frames are successively captured image frames of the scene at a common focus 708.

In one or more implementations, applying the first visual recognition process includes applying by the first visual recognition process a convolution neural network to an entire image frame of the one or more image frames, and applying the second visual recognition process includes applying by the second visual recognition process a convolution neural network to an entire image frame of the one or more other image frames of the multiple image frames 710.

In one or more embodiments, the plurality of visual recognition processes can include a plurality of You-Only-Look-Once (YOLO) visual recognition processes, each utilizing a different grid size 712. As illustrated in FIG. 7B, in one or more embodiments, m is a first integer, and n is a second integer, and n×m 714.

In one or more embodiments, the one or more other image frames of the multiple image frames with the second visual recognition process applied thereto are successive image frames of the captured scene from the one or more image frames with the first visual recognition process applied thereto 716.

In one or more embodiments, the predefined time interval is a first predefined time interval 718, and in addition: based on detecting passage of a second predefined time interval, less than the period of time, dynamically switching to a third visual recognition process of the plurality of visual recognition processes to process one or more further image frames of the multiple image frames 720; and applying the third visual recognition process to the one or more further image frames of the multiple image frames, the third visual recognition process dividing the one or more further image frames into a p×p grid to determine bounding boxes for identifying one or more further objects in the one or more further image frames, in addition to the one or more objects identified by applying the first visual recognition process and the one or more other object identified by applying the second visual recognition process, wherein the p×p grid used by the third visual recognition process is different from the n×n grid used by the second visual recognition process, and is different from the m×m grid used by the first visual recognition process 722.

In one or more embodiments, m is a first integer, n is a second integer, p is a third integer, and p>n>m 724.

Further, in one or more embodiments, the multiple image frames are captured by an electronic device, and the method further includes indicating on a display of the electronic device identified objects of the scene, the identified objects including one or more objects identified in the one or more image frames and the one or more other objects identified in the one or more other image frames 726.

Further exemplary embodiments of a computing environment to implement one or more aspects of the present invention are described below with reference to FIGS. 8-10.

By way of further example, FIG. 8 depicts one embodiment of a computing environment 800, which includes a computing system 812. Examples of well-known computing systems, environments, and/or configurations that may be suitable for use with computer system 812 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 812 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 8, computing system 812, is shown in the form of a general-purpose computing device. The components of computing system 812 can include, but are not limited to, one or more processors or processing units 816, a system memory 823, and a bus 818 that couples various system components including system memory 823 to processor 816.

In one embodiment, processor 816 may be based on the z/Architecture® offered by International Business Machines Corporation, or other architectures offered by International Business Machines Corporation or other companies.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 812 can include a variety of computer system readable media. Such media may be any available media that is accessible by computing system 812, and it includes both volatile and non-volatile media, removable and non-removable media.

System memory 823 can include computer system readable media in the form of volatile memory, such as random access memory (RAM) 830 and/or cache memory 832. Computing system 812 can further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 818 by one or more data media interfaces. As described below, memory 823 can include at least one program product having a set (e.g., at least one) of program modules or code that are configured to carry out the functions of embodiments of the invention.

Program/utility 840, having a set (at least one) of program modules 842, can be stored in memory 832 by way of example, and not limitation, as well as an operating system, one or more application programs, other program modules, and program data. Each of the operating system, one or more application programs, other program modules, and program data or some combination thereof, can include an implementation of a networking environment. Program modules 842 generally carry out the functions and/or methodologies of embodiments of the invention as described herein. Alternatively, a visual recognition processing facility, module, logic, etc., 801 can be provided within computing environment 812 implementing one or more aspects of management system processing, such as disclosed herein.

Computing system 812 can also communicate with one or more external devices 814 such as a keyboard, a pointing device, a display 824, etc.; one or more devices that enable a user to interact with computing system 812; and/or any devices (e.g., network card, modem, etc.) that enable computing system 812 to communicate with one or more other computing devices. Such communication can occur via Input/Output (I/O) interfaces 822. Still yet, computing system 812 can communicate with one or more networks such as a local area network (LAN), a general wide area network (WAN), and/or a public network (e.g., the Internet) via network adapter 820. As depicted, network adapter 820 communicates with the other components of computing system, 812, via bus 818. It should be understood that although not shown, other hardware and/or software components could be used in conjunction with computing system 812. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 8. Computer system/server 812 of FIG. 8 can be practiced in distributed cloud computing environments where tasks are performed by remote processing devices that are linked through a communications network. In a distributed cloud computing environment, program modules may be located in both local and remote computer system storage media including memory storage devices. Computer system/server 812 is capable of being implemented and/or performing any of the functionality set forth hereinabove.

Figure 9:
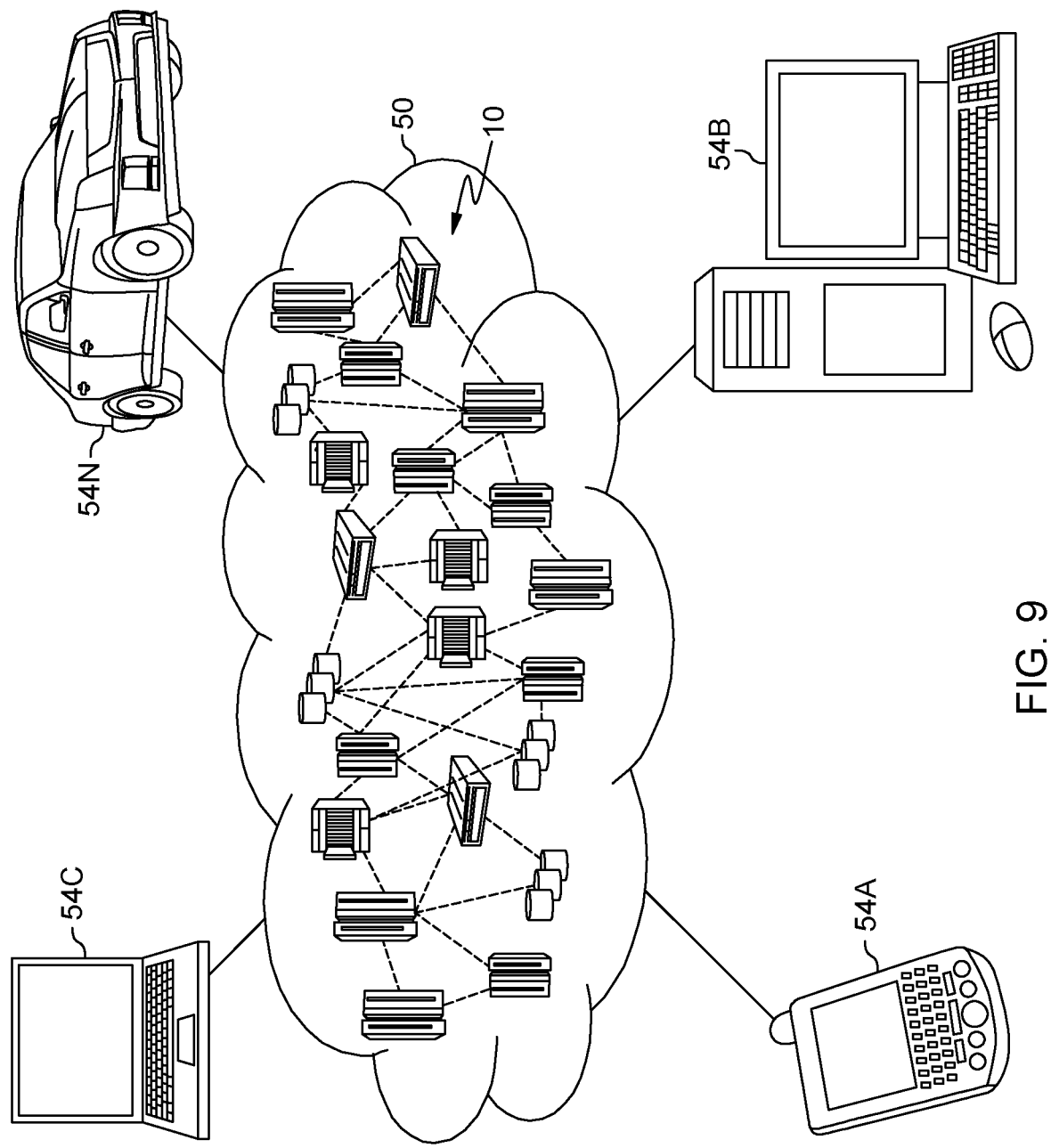
FIG. 9 depicts one embodiment of a cloud computing environment which can facilitate implementing, or be used in association with, one or more aspects of the present invention.

Referring now to FIG. 9, illustrative cloud computing environment 50 is depicted. As shown, cloud computing environment 50 can comprise one or more cloud computing nodes 8 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
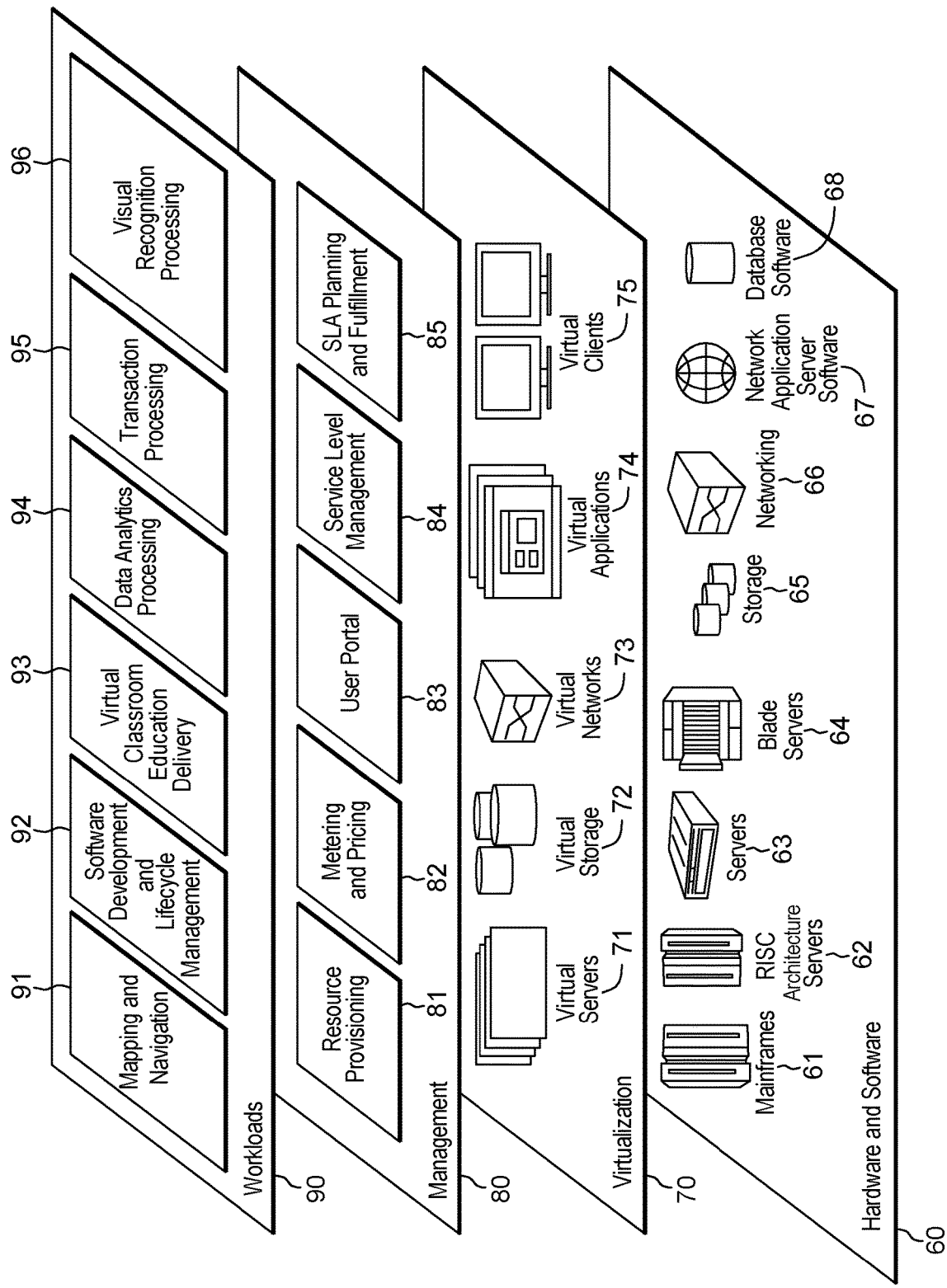
FIG. 10 depicts an example of abstraction model layers according to an embodiment of the present invention.

Referring to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and visual recognition processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
processing, by one or more processors, multiple image frames of a captured scene for object recognition, the multiple image frames being captured over a period of time, the processing including:
applying a first visual recognition process, of a plurality of visual recognition processes using different grid sizes, to one or more image frames of the multiple image frames, the first visual recognition process dividing the one or more image frames into an m×m grid to determine bounding boxes for identifying one or more objects in the one or more image fames;
based on detecting passage of a predefined time interval, less than the period of time, dynamically switching to a second visual recognition process of the plurality of visual recognition processes to process one or more other image frames of the multiple image frames; and
applying the second visual recognition process to the one or more other image frames of the multiple image frames, the second visual recognition process dividing the one or more other image frames into an n×n grid to determine bounding boxes for identifying one or more other objects in the one or more other image frames, in addition to the one or more objects in the one or more image frames identified applying the first visual recognition process, wherein the n×n grid used by the second visual recognition process is different from the m×m grid used by the first visual recognition process.

2. The computer-implemented method of claim 1, wherein the multiple image frames are successively captured image frames of the scene at a common focus.

3. The computer-implemented method of claim 1, wherein applying the first visual recognition process comprises applying by the first visual recognition process a convolution neural network to an entire image frame of the one or more image frames, and applying the second visual recognition process comprises applying by the second visual recognition process a convolution neural network to an entire image frame of the one or more other image frames of the multiple image frames.

4. The computer-implemented method of claim 3, wherein the plurality of visual recognition processes comprise a plurality of You-Only-Look-Once (YOLO) visual recognition processes, each utilizing a different grid size.

5. The computer-implemented method of claim 4, wherein m is a first integer, n is a second integer, and n>m.

6. The computer-implemented method of claim 1, wherein the one or more other image frames of the multiple image frames with the second visual recognition process applied thereto are successive image frames of the captured scene from the one or more image frames with the first visual recognition process applied thereto.

7. The computer-implemented method of claim 1, wherein the predefined time interval is a first predefined time interval, and the method further comprises:
based on detecting passage of a second predefined time interval, less than the period of time, dynamically switching to a third visual recognition process of the plurality of visual recognition processes to process one or more further image frames of the multiple image frames; and applying the third visual recognition process to the one or more further image frames of the multiple image frames, the third visual recognition process dividing the one or more further image frames into a p×p grid to determine bounding boxes for identifying one or more further objects in the one or more further image frames, in addition to the one or more objects identified by applying the first visual recognition process and the one or more other objects identifying by applying the second visual recognition process, wherein the p×p grid used by the third visual recognition process is different from the n×n grid used by the second visual recognition process, and is different from the m×m grid used by the first visual recognition process.

8. The computer-implemented method of claim 7, wherein m is a first integer, n is a second integer, p is a third integer, and p>n>m.

9. The computer-implemented method of claim 1, wherein the multiple image frames are captured by an electronic device, and the method further comprises indicating on a display of the electronic device identified objects in the scene, the identified objects including the one or more objects identified in the one or more image frames and the one or more other objects identified in the one or more other image frames.

10. A computer system comprising:
a memory; and
a processor communicatively coupled to the memory, wherein the computer system is configured to perform a method comprising:
   processing, by one or more processors, multiple image frames of a captured scene for object recognition, the multiple image frames being captured over a period of time, the processing including:
      applying a first visual recognition process, of a plurality of visual recognition processes using different grid sizes, to one or more image frames of the multiple image frames, the first visual recognition process dividing the one or more image frames into an m×m grid to determine bounding boxes for identifying one or more objects in the one or more image fames;
      based on detecting passage of a predefined time interval, less than the period of time, dynamically switching to a second visual recognition process of the plurality of visual recognition processes to process one or more other image frames of the multiple image frames; and
      applying the second visual recognition process to the one or more other image frames of the multiple image frames, the second visual recognition process dividing the one or more other image frames into an n×n grid to determine bounding boxes for identifying one or more other objects in the one or more other image frames, in addition to the one or more objects in the one or more image frames identified applying the first visual recognition process, wherein the n×n grid used by the second visual recognition process is different from the m×m grid used by the first visual recognition process.

11. The computer system of claim 10, wherein the multiple image frames are successively captured image frames of the scene at a common focus.

12. The computer system of claim 10, wherein applying the first visual recognition process comprises applying by the first visual recognition process a convolution neural network to an entire image frame of the one or more image frames, and applying the second visual recognition process comprises applying by the second visual recognition process a convolution neural network to an entire image frame of the one or more other image frames of the multiple image frames.

13. The computer system of claim 12, wherein the plurality of visual recognition processes comprise a plurality of You-Only-Look-Once (YOLO) visual recognition processes, each utilizing a different grid size.

14. The computer system of claim 13, wherein m is a first integer, n is a second integer, and n>m.

15. The computer system of claim 10, wherein the one or more other image frames of the multiple image frames with the second visual recognition process applied thereto are successive image frames from the one or more image frames of the captured scene with the first visual recognition process applied thereto.

16. The computer system of claim 10, wherein the predefined time interval is a first predefined time interval, and the method further comprises:
   based on detecting passage of a second predefined time interval, less than the period of time, dynamically switching to a third visual recognition process of the plurality of visual recognition processes to process one or more further image frames of the multiple image frames; and
   applying the third visual recognition process to the one or more further image frames of the multiple image frames, the third visual recognition process dividing the one or more further image frames into a p×p grid to determine bounding boxes for identifying one or more further objects in the one or more further image frames, in addition to the one or more objects identified by applying the first visual recognition process and the one or more other objects identifying by applying the second visual recognition process, wherein the p×p grid used by the third visual recognition process is different from the n×n grid used by the second visual recognition process, and is different from the m×m grid used by the first recognition process.

17. A computer program product comprising:
a computer-readable storage medium readable by a processing circuit and storing instructions for execution by the processing circuit for performing a method comprising:
   processing, by one or more processors, multiple image frames of a captured scene for object recognition, the multiple image frames being captured over a period of time, the processing including:
      applying a first visual recognition process, of a plurality of visual recognition processes using different grid sizes, to one or more image frames of the multiple image frames, the first visual recognition process dividing the one or more image frames into an m×m grid to determine bounding boxes for identifying one or more objects in the one or more image fames;
      based on detecting passage of a predefined time interval, less than the period of time, dynamically switching to a second visual recognition process of the plurality of visual recognition processes to process one or more other image frames of the multiple image frames; and
      applying the second visual recognition process to the one or more other image frames of the multiple image frames, the second visual recognition process dividing the one or more other image frames into an n×n grid to determine bounding boxes for identifying one or more other objects in the one or more other image frames, in addition to the one or more objects in the one or more image frames identified applying the first visual recognition process, wherein the n×n grid used by the second visual recognition process is different from the m×m grid used by the first visual recognition process.

18. The computer program product of claim 17, wherein the multiple image frames are successively captured image frames of the scene at a common focus.

19. The computer program product of claim 17, wherein applying the first visual recognition process comprises applying by the first visual recognition process a convolution neural network to an entire image frame of the one or more image frames, and applying the second visual recognition process comprises applying by the second visual recognition process a convolution neural network to an entire image frame of the one or more other image frames of the multiple image frames.

20. The computer program product of claim 19, wherein the plurality of visual recognition processes comprise a plurality of You-Only-Look-Once (YOLO) visual recognition processes, each utilizing a different grid size.

* * * * *